United States Patent [19]

Pines

[11] 3,914,318
[45] Oct. 21, 1975

[54] PROCESS FOR PREPARING 4-METHYLSULFINYLBENZALDEHYDE
[75] Inventor: Seemon H. Pines, Murray Hill, N.J.
[73] Assignee: Merck & Co., Inc., Rahway, N.J.
[22] Filed: May 24, 1973
[21] Appl. No.: 363,704

[52] U.S. Cl. ............................... 260/599; 260/514 J
[51] Int. Cl.² ......................................... C07C 47/52
[58] Field of Search ................................... 260/599

[56] References Cited
UNITED STATES PATENTS
3,712,913  1/1973  Chodnekar et al. ............ 260/599 X
3,732,292  5/1973  Hinkley et al. ................. 260/599 X OTHER PUBLICATIONS
Eistert, et al., Ber. 97, 1470 (1964).
Karaulova et al., Chem. Abstract, 65, 10452f, (1966).
Peak et al., J. Chem. Soc., pp. 445–452, (1950).
Gazdar et al., J. Chem. Soc., 93, 1833, (1908).

*Primary Examiner*—Bernard Helfin
*Assistant Examiner*—Nicky Chan
*Attorney, Agent, or Firm*—Mario A. Monaco; Harry E. Westlake, Jr.

[57] ABSTRACT

4-Methylsulfinylbenzaldehyde is prepared by hydrogen peroxide oxidation of 4-methylthiobenzaldehyde in an alkanoic acid or a mixture of an alkanoic acid and a haloalkane. The product is useful as a starting material for the production of a known antiinflammatory agent.

5 Claims, No Drawings

PROCESS FOR PREPARING 4-METHYLSULFINYLBENZALDEHYDE

This invention is concerned with a process for the preparation of 4-methylsulfinylbenzaldehyde which comprises oxidation of 4-methylthiobenzaldehyde. The product of this novel process is an important intermediate in the synthesis of 5-fluoro-1-(4-methylsulfinylbenzylidene)-2-methylindenyl-3-acetic acid, a known antiinflammatory, analgesic and antipyretic agent. More particularly, this invention is concerned with the oxidation of 4-methylthiobenzaldehyde with hydrogen peroxide to 4-methylsulfinylbenzaldehyde.

The prior art, Eistert et al., Ber., 97, 1470–81 (1964) describes the oxidation of the isomeric 2-methylthiobenzaldehyde with hydrogen peroxide in acetone for 14 days to yield 2-methylsulfinylbenzaldehyde, and with hydrogen peroxide in acetic acid to yield 2-methylsulfonylbenzaldehyde.

Surprisingly, it has now been found that in the case of the 4-position isomer, good yields of 4-methylsulfinylbenzaldehyde can be achieved in only 2–15 hours by oxidizing 4-methylthiobenzaldehyde with hydrogen peroxide. Even more surprising, it has been found that oxidation to the methylsulfinyl compound in a lower alkanoic acid milieu, which is known in the art to promote oxidation to the higher oxidation state of the sulfone, produces almost undetectable amounts of the 4-methylsulfonylbenzaldehyde.

To conduct the novel process of this invention, the starting material, 4-methylthiobenzaldehyde is dissolved in a $C_{1-5}$ alkanoic acid containing up to an equal proportion by volume of a haloalkane such as chloroform, methylene chloride, or ethylene dichloride. This resulting solution is treated with from 1–3 molar equivalents of hydrogen peroxide, conveniently in the form of the commercially available aqueous hydrogen peroxide solutions. The reaction temperature is not critical and may be at any temperature between about −15°C. and 30°C. Reaction times are dependent on temperature and vary from about 2 hours to about 15 hours.

It is preferable to conduct the process in a $C_{2-3}$ alkanoic acid alone or mixed with up to an equal volume of the haloalkane such as chloroform, methylene chloride, or ethylene dichloride with from 1 to about 1.1 molar equivalents of hydrogen peroxide being added slowly at −15°C. to about +5°C. and permitting the mixture to warm slowly to room temperature where it is aged for about 2–15 hours.

The product of the process of this invention, 4-methylsulfinylbenzaldehyde, is a key intermediate in the synthesis of an important antiinflammatory agent 5-fluoro-1-(4-methylsulfinylbenzylidene)-2-methylindenyl-3-acetic acid. The process for its preparation is described in the examples to follow.

EXAMPLE 1

4-Methylsulfinylbenzaldehyde

A mixture of 38 g. (0.25 mole) of 4-methylthiobenzaldehyde in 12 ml. of water and 100 ml. of glacial acetic acid was cooled to −10° to −15°C. Aqueous hydrogen peroxide (35 ml. of 30%) (0.287 mole) was added over 45 minutes while maintaining the temperature at −10° to −15°C. The reaction mixture was then warmed to 0°–5° and aged at 0°–5° for 1 hour. Over the next hour, the reaction was warmed to 22°–25° and aged at this temperature for 3 hours. The reaction was quenched in 500 ml. of water. The aqueous layer was then extracted with 200 ml. and with 50 ml. of chloroform. The combined chloroform extracts were washed with 200 ml. of water, 100 ml. of saturated aqueous sodium bicarbonate, and 50 ml. of water. The organic layer was concentrated in vacuo and the residue was dried by azeotropic distillation of toluene from it. The residual toluene slurry was then diluted to a volume of about 95 ml. with warm (50°) toluene and then cooled to 0°–5° and aged at 0°–5° for 2 hours. The crystalline product was collected by filtration and washed with 2 × 20 ml. of cold toluene. After drying in vacuo at 40°, 25.2 g. (60%) of 4-methylsulfinylbenzaldehyde, m.p. 89°–91.5°, was obtained. Nuclear magnetic resonance studies showed 0.1% of the sulfone.

EXAMPLE 2

A solution of 7.6 g. of p-methylthiobenzaldehyde in 12 ml. of acetic acid and 8 ml. of chloroform was cooled to 0°–5°C. and maintained at that temperature while 6.9 ml. of 8.35 molar hydrogen peroxide was added over a 15–20 minute period. After an additional hour at 0°–5°, the temperature was raised to 23°–26° over 30 minutes and held there for 15 additional hours. The reaction was quenched by adding 36 ml. of water and 20 ml. of chloroform. The upper layer was extracted with 2 × 20 ml. of chloroform, the extracts being added to the original chloroform (lower) layer. The combined organic layer was washed with 20 ml. of water, then 20 ml. of saturated sodium bicarbonate solution, after which it tested neutral to alkacid paper and free of oxidant by starch-iodide paper.

The chloroform solution was evaporated to dryness, and taken up in 15 ml. of hot toluene. It was allowed to cool slowly, depositing crystals of the product. After 5 hours at 0°–5°, the product was filtered and washed with 10 ml. of cold toluene. Vacuum drying gave 6.5 g., m.p. 89°–91°. Analysis showed 0.3% of the corresponding sulfone as an impurity.

EXAMPLE 3

5-Fluoro-1-(4-Methylsulfinylbenzylidene)-2-Methylindenyl-3-Acetic Acid

5-Fluoro-2-methylindenyl-3-acetic acid (15.0 g., 0.072 mole), 4-methylsulfinylbenzaldehyde (15.3 g., 0.091 mole) and sodium methoxide (13.0 g., 0.24 mole) are heated in methanol (200 ml.) at 60°C. under nitrogen with stirring for 6 hours. After cooling, the reaction mixture is poured into 750 ml. of ice-water, acidified with 2.5 N hydrochloric acid, and the collected solid triturated with a little ether to produce 5-fluoro-1-(4-methylsulfinylbenzylidene)-2-methylindenyl-3-acetic acid, m.p. 184°–186°C.

What is claimed is:

1. A process for the preparation of 4-methylsulfinylbenzaldehyde which comprises treating 4-methylthiobenzaldehyde in a solvent consisting of a $C_{1-5}$ alkanoic acid containing up to an equal proportion by volume of a haloalkane with 1–3 molar equivalents of hydrogen peroxide at −15°C. to 30°C. for 2–15 hours.

2. The process of claim 1 wherein the solvent is a $C_{2-3}$ alkanoic acid containing up to an equal volume of a haloalkane selected from chloroform, methylene chloride and ethylene dichloride.

3. The process of claim 2 wherein 1–1.1 molar equivalents of hydrogen peroxide is added at −15°C. to +5°C. and then warmed slowly to room temperature and held there for 2–15 hours.

4. The process of claim 3 wherein the solvent is acetic acid.

5. The process of claim 3 wherein the solvent is a mixture of acetic acid and chloroform.

* * * * *